Nov. 10, 1959 E. DE NIET ET AL 2,912,521

MAGNETIC RECORDING APPARATUS

Filed July 29, 1957

INVENTOR
EDMOND DE NIET
DERK KLEIS
BY Frank R. Jifari
AGENT

United States Patent Office 2,912,52

Patented Nov. 10, 195

2,912,521

MAGNETIC RECORDING APPARATUS

Edmond De Niet and Derk Kleis, Eindhoven, Netherlands, assignors to North American Philips Company Inc., New York, N.Y., a corporation of Delaware

Application July 29, 1957, Serial No. 674,701

Claims priority, application Netherlands August 30, 1956

6 Claims. (Cl. 179—100.2)

The present invention relates to magnetic recording apparatus. More particularly, the invention relates to magnetic recording apparatus in which the recording head is connected, during operation, to an oscillator in order to obtain the high-frequency premagnetizing current required for recording. The apparatus of the present invention substantially eliminates direct current magnetization in the recording due to remanent magnetization in the recording head.

Each magnetic recording material has its particular premagnetizing current which yields the best dynamic conditions for the recording operation. The magnetic recording and/or reproducing apparatus is preferably used in conjunction with a particular magnetic recording material, the premagnetizing current being adjusted for this combination to the said optimum value (operational value).

With magnetic recording there is, in principle, no difference between positive and negative signals, so that, when recording a pure alternating current signal, no direct current magnetization or distortion due to even harmonics occurs in the magnetic recording material or tape. If, in some way or other direct current magnetization were recorded in the tape, the zero noise of the recording would be increased by the modulation noise of the direct current magnetization, and at the same time distortion due to even harmonics would be introduced; both of these factors reduce the dynamic range for the recording operation. Such an interfering direct current magnetization may be due to remanent magnetization of the recording head.

In accordance with the present invention, the oscillator includes a control device which, upon an increase in premagnetizing current intensity, produces such a decrease in the amplification of the arrangement that, in spite of the voltage limiting effect of the said control device, the premagnetizing current increases after the oscillator has been made operative. The premagnetizing current increases up to a value which is smaller than or equal to the value ($i_1$) at which the oscillator current is limited by non linear effects. This value ($i_1$) exceeds, however, the value ($i_2$) of the premagnetizing current required for recording and is equal to or higher than the value ($i_3$) for the demagntization of the recording head. The latter value ($i_3$) exceeds the operational value ($i_2$) of the premagnetizing current, which is continuously reduced to the operational value $i_2$ only by the effect of the said control device.

Thus the premagnetizing current is utilized simultaneously for the demagnetization of the recording head before reaching the adjusted operational value.

To clarify the invention, it is observed that in the absence of the said control device the oscillator current (premagnetizing current), would increase, when the oscillator is made operative, until it is limited automatically to a value determined by the non-linearity of the tube characteristic. The control device has the effect that on the one hand the premagnetizing current, after its increase, is reduced to the lower operational value $i_2$, a which non-linear distortion does not occur and that, o the other hand, the oscillator current increases to a valu sufficient for the core of the recording head to be de magnetized, so that the initial phenomena, in this cas the remanent magnetism, are eliminated. When th value, which exceeds the value of the premagnetizin current has been reached, it can be reduced to the valu of the premagnetizing current.

In one embodiment of the invention the said contro device is included in the control grid circuit of the osci lator tube. The control device is constituted by a re sistor with a negative temperature coefficient (NTC re sistor). The thermal capacity of such a negative tem perature coefficient resistor is such that the aforesai conditions for the course of the premagnetizing curren as a function of time, are fulfilled. As an alternative, th control device may be constituted by a diode circuit, of type known in the art, which acts with such a time la that the aforesaid conditions are also fulfilled.

In order that the invention may be readily carrie into effect, it will now be described with reference t the accompanying drawing, wherein.

Figure 1:
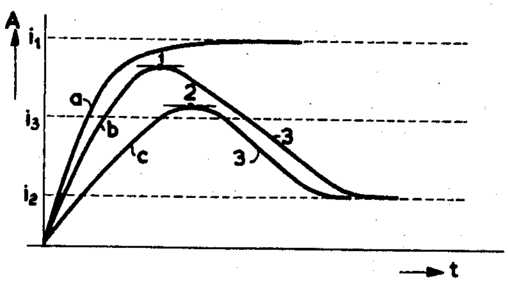
Fig. 1 is a graphical presentation of the operating prin ciple of the apparatus of the present invention.

The curves of Fig. 1 show the course of the high fre quency premagnetizing current intensity A as a functio of the time *t*. Curve *a* designates the course of the pre magnetizing current in the absence of the said contro device, so that the current is automatically limited b non-linear effects of the oscillator tube to a value $i_1$. Wit the apparatus of the present invention, in which the sai control device is employed, the effect of the control devic is to reduce finally the premagnetizing current to a value which is always lower than $i_1$, so that non linear distortio of the current is avoided. On the other hand, the osci lator current increases to a value such that it is sufficier to demagnetize the core of the recording head, whic takes place at the value $i_3$. Then the premagnetizing cu rent is continuously reduced to the operation value $i_2$. O the curves fulfilling the aforesaid conditions, two are in dicated in Fig. 1, i.e. the curves *b* and *c*. By suitabl choice of the control device it is possible to fix at will, th instant when the premagnetizing current is reduced t the operational value, since by this choice the time whe the increase in oscillator current is eliminated by th counteraction of the said device, can be fixed (the instant 1 and 2 respectively of Fig. 1), after which the course c the premagnetizing current depends only upon the effec of the said control device (branch 3 of curves *b* and *c* o Fig. 1).

Figure 2:
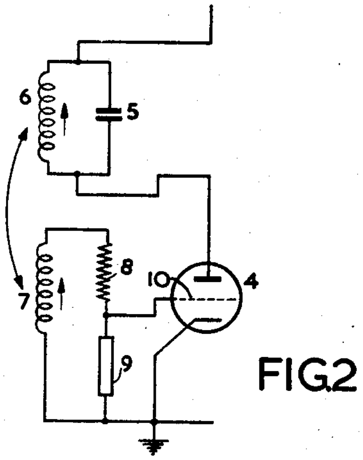
Fig. 2 is a schematic diagram of an embodiment of th apparatus of the present invention.

Referring to Fig. 2, reference numeral 4 designates high frequency oscillator tube, the anode circuit of whic includes a resonant circuit consisting of a capacitor and a coil 6. The coil 6 is inductively fed back to coil 7, which is included with a potentiometer consistin of a resistor 8 and an NTC resistor 9 in the control gri circuit of the tube 4. Part of the alternating voltag produced in the coil 7 is branched between the resisto 8 and 9 of the potentiometer and superimposed on th negative bias voltage of the grid 10 of the tube 4. Thi bias determines the adjustment of the high frequenc oscillator tube 4. At the instant when the tube 4 i switched on to supply the high frequency premagnetizin current for the recording operation, the amplification c the arrangement is already so high that the amplitud of the high frequency premagnetizing current increase rapidly. Due to the absorption of dissipated power, th alue of the NTC resistor drops, so that on the one hand ie negative bias voltage increases, and hence the amplication of the arrangement increases, and on the other and the feedback is partly compensated, since a smaller mount of high frequency alternating voltage occurs at ie grid. The thermal capacity of the NTC resistor is hosen to be such that the voltage restricting effect theref does not become manifest before the high frequency remagnetizing current has increased to a value which ; equal to or smaller than the value $i_1$ (Fig. 1) at which ie oscillator current is limited by non linear effects. The alue $i_1$ is, however, higher than the value of the reuired premagnetizing current $i_2$ and equal to or higher han the value $i_3$, at which the recording head is demagetized. The value $i_3$ exceeds the operational value $i_2$ f the premagnetizing current. Then only the effect of ie NTC resistor continuously reduces the premagnetizig current to the value $i_2$.

Figure 3:
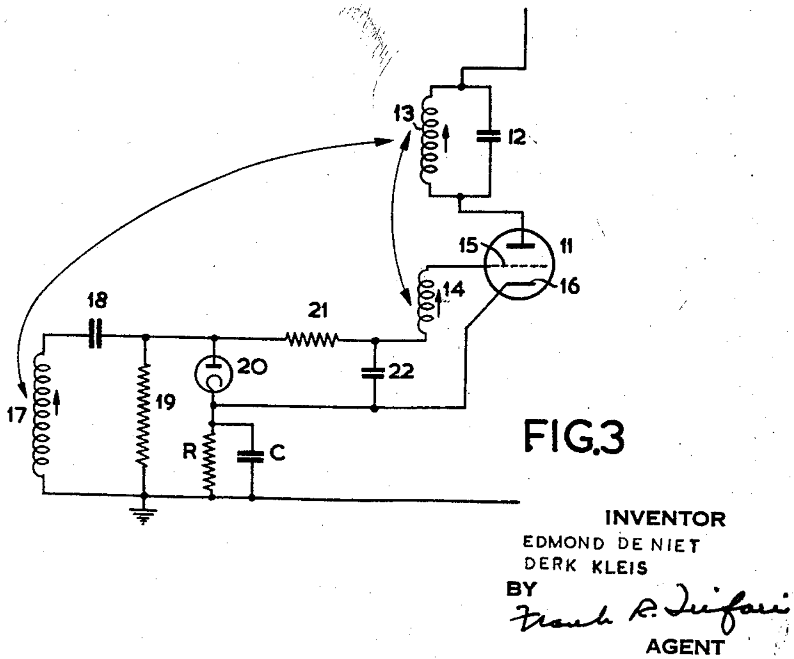
Fig. 3 is a schematic diagram of another embodimer of the apparatus of the present invention.

In Fig. 3, the oscillator circuit comprises a high freuency oscillator tube 11 and a resonant circuit included a the anode circuit and consisting of a capacitor 12 and coil 13 the coil 13 being inductively fed back to a coil 4, which is connected to the grid 15 of the tube 11. he cathode 16 is connected to ground via an RC circuit. part from this circuit, provision is made of a circuit ncluded between the coil 14 and the cathode 16 and apable of producing a variable bias voltage for the conrol grid. Thus, provision is made at the input of a coil 7, which is inductively fed back to the coil 13. The igh frequency alternating current produced in the coil 7 is rectified by a diode 20, after it has passed through n RC circuit having component parts $C_{18}$ and $R_{19}$. The iode 20 is adjusted to a threshold value by the cathode oltage. The rectified voltage thus obtained is smoothed y a filter consisting of a resistor 21 and a capacitor 22 nd is applied to the grid 15 after the high frequency lternating voltage produced in the coil 14 has been uperimposed thereon.

The negative bias voltage at the grid determines the djustment of the tube 11. At the instant when the tube 1 is switched on to supply the high frequency premagetizing current for the recording operation, the diode 20 ; cut off by the threshold voltage. The tube 11 then opertes with the maximum transconductance and the alternatng anode current increases considerably. Thus, initially he amplitude of the high frequency premagnetizing curent increases rapidly, after which the feedback between he coil 13 and the coil 14 is partly compensated, since the liode 20 becomes conductive due to the fact that the igh frequency oscillation produced across the coil 17 xceeds the threshold voltage of the diode 20. The voltge rectified by the diode circuit charges the capacitor 22, vhich causes a decrease in transconductance of the tube 1. Thus the high frequency premagnetizing current is imited. By a suitable choice of the time constant of he component parts 21 and 22 it can be ensured that fter the initial increase in premagnetizing current the estriction becomes operative not until the premagnetizing urrent reaches the value $i_3$ or after it has reached this alue. Then the premagnetizing current drops continuusly to the operational value $i_2$.

In spite of the voltage reducing effect of the diode ircuit, the premagnetizing current will first increase to a alue lying below the value $i_1$, at which the oscillator curent is limited by non-linear effects (see Fig. 1), which alue, however, exceeds the value of the required preagnetizing current $i_2$ and which is equal to or higher han the value $i_3$ for the demagnetization of the recordng head. The value $i_3$ exceeds the operational value $i_2$ f the premagnetizing current. Then the premagnetizing urrent is reduced to the operational value $i_2$ only by the ffect of the diode circuit.

While the invention has been described by means of pecific examples and in specific embodiments, we do not rish to be limited thereto, for obvious modifications will occur to those skilled in the art without departing from the spirit and scope of the invention.

What is claimed is:

1. Magnetic recording apparatus for producing high frequency premagetizing current for a magnetic recording head and for demagnetizing said head, said apparatus comprising an oscillator circuit arrangement for producing said premagnetizing current, and means for bringing said premagnetizing current for a relatively brief period of time to a point above a magnitude level at which demagnetization of said head is effected and for thereafter reducing said premagnetizing current to a second magnitude level at which recording operation is effected by said head.

2. Magnetic recording apparatus comprising an oscillator circuit arrangement for producing high frequency premagnetizing current for a magnetic recording head, said premagnetizing current increasing relatively rapidly in amplitude upon energization of said oscillator circuit and tending to reach a first magnitude level at which it is subject to non-linear distortion, said first magnitude level being relatively greater than a second magnitude level at which recording operation is effected by said head, and means included in said oscillator circuit for limiting said premagnetizing current to a third magnitude level which is relatively smaller than said first level and relatively greater than a magnitude level at which demagnetization of said head is effected and for thereafter continuously reducing said premagnetizing current to said second level thereby simultaneously providing premagnetizing current for said head and substantially eliminating direct current magnetization of said head and substantially eliminating non-linear distortion of said premagnetizing current, said third level being relatively greater than said second level.

3. Magnetic recording apparatus comprising an oscillator circuit arrangement for producing high frequency premagnetizing current for a magnetic recording head, said premagnetizing current increasing relatively rapidly in amplitude upon energization of said oscillator circuit and tending to reach a first magnitude level at which it is subject to non-linear distortion, said first magnitude level being relatively greater than a second magnitude level at which recording operation is effected by said head, and a resistor having a negative temperature coefficient included in said oscillator circuit for limiting said premagnetizing current to a third magnitude level which is relatively smaller than said first level and relatively greater than a magnitude level at which demagnetization of said head is effected and for thereafter continuously reducing said premagnetizing current to said second level thereby simultaneously providing premagnetizing current for said head and substantially eliminating direct current magnetization of said head and substantially eliminating non-linear distortion of said premagnetizing current, said third level being relatively greater than said second level.

4. Magnetic recording apparatus comprising an oscillator circuit arrangement for producing high frequency premagnetizing current for a magnetic recording head, said premagnetizing current increasing relatively rapidly in amplitude upon energization of said oscillator circuit and tending to reach a first magnitude level at which it is subject to non-linear distortion, said first magnitude level being relatively greater than a second magnitude level at which recording operation is effected by said head, and a control circuit having a diode included in said oscillator circuit for limiting said premagnetizing current to a third magnitude level which is relatively smaller than said first level and relatively greater than a magnitude level at which demagnetization of said head is effected and for thereafter continuously reducing said premagnetizing current to said second level thereby simultaneously providing premagnetizing current for said head and substantially eliminating direct current magnetization of said head and substantially eliminating non-linear distortion of said premagnetizing current, said third level being relatively greater than said second level.

5. Magnetic recording apparatus comprising an oscillator circuit arrangement for producing high frequency premagnetizing current for a magnetic recording head, said oscillator circuit comprising an electron discharge tube having a plurality of electrodes including a control grid, said control grid forming an input electrode system with one of said electrodes, said premagnetizing current increasing relatively rapidly in amplitude upon energization of said oscillator circuit and tending to reach a first magnitude level at which it is subject to non-linear distortion, said first magnitude level being relatively greater than a second magnitude level at which recording operation is effected by said head, and a resistor having a negative temperature coefficient included in said input electrode system for limiting said premagnetizing current to a third magnitude level which is relatively smaller than said first level and relatively greater than a magnitude level at which demagnetization of said head is effected and for thereafter continuously reducing said premagnetizing current to said second level thereby simultaneously providing premagnetizing current for said head and substantially eliminating direct current magnetization of said head and substantially eliminating non-linear distortion of said premagnetizing current, said third level being relatively greater than said second level.

6. Magnetic recording apparatus comprising an oscillator circuit arrangement for producing high frequency premagnetizing current for a magnetic recording head, said oscillator circuit comprising an electron discharge tube having a plurality of electrodes including a control grid, said control grid forming an input electrode system with one of said electrodes, said premagnetizing current increasing relatively rapidly in amplitude upon energization of said oscillator circuit and tending to reach a first magnitude level at which it is subject to non-linear distortion, said first magnitude level being relatively greater than a second magnitude level at which recording operation is effected by said head, and a control circuit having a diode included in said input electrode system for limiting said premagnetizing current to a third magnitude level which is relatively smaller than said first level and relatively greater than a magnitude level at which demagnetization of said head is effected and for thereafter continuously reducing said premagnetizing current to said second level thereby simultaneously providing premagnetizing current for said head and substantially eliminating direct current magnetization of said head and substantially eliminating non-linear distortion of said premagnetizing current, said third level being relatively greater than said second level.

References Cited in the file of this patent

UNITED STATES PATENTS 2,628,287 Haynes ---------------- Feb. 10, 1953

FOREIGN PATENTS 218,407 Switzerland ------------ Mar. 16, 1942